US010210722B2

(12) United States Patent
Cruz-Hernandez et al.

(10) Patent No.: US 10,210,722 B2
(45) Date of Patent: Feb. 19, 2019

(54) HAPTIC NOTIFICATION COMMUNICATION SYSTEM

(71) Applicant: Immersion Corporation, San Jose, CA (US)

(72) Inventors: Juan Manuel Cruz-Hernandez, Montreal (CA); Abdelwahab Hamam, Montreal (CA); Robert Lacroix, Saint-Lambert (CA)

(73) Assignee: IMMERSION CORPORATION, San Jose, CA (US)

( * ) Notice: Subject to any disclaimer, the term of this patent is extended or adjusted under 35 U.S.C. 154(b) by 41 days.

(21) Appl. No.: 14/739,002

(22) Filed: Jun. 15, 2015

(65) Prior Publication Data

US 2016/0364961 A1    Dec. 15, 2016

(51) Int. Cl.
*G08B 6/00* (2006.01)
*H04L 29/08* (2006.01)
*G05B 19/00* (2006.01)
*G05B 23/02* (2006.01)
*B25F 5/00* (2006.01)

(52) U.S. Cl.
CPC .............. *G08B 6/00* (2013.01); *B25F 5/00* (2013.01); *G05B 19/00* (2013.01); *G05B 23/0272* (2013.01); *H04L 67/12* (2013.01); *H04L 67/26* (2013.01)

(58) Field of Classification Search
CPC ....... G08B 6/00; G08B 13/2428; G06F 3/016; G06F 3/011; G10L 15/265; G05B 19/4184; G05B 19/00; G05B 23/0272; H04W 4/029; B25F 5/00

USPC ..... 340/4.1, 4.12, 6.1, 539.1, 539.11, 539.14
See application file for complete search history.

(56) References Cited

U.S. PATENT DOCUMENTS

| 5,291,416 A * | 3/1994 | Hutchins ............ G05B 19/4184 700/174 |
| 9,141,105 B2 * | 9/2015 | Trepina ................. G05B 19/406 |
| 2002/0026514 A1* | 2/2002 | Ellis ..................... G05B 19/4185 709/227 |
| 2006/0187082 A1* | 8/2006 | Estefania ............... G06Q 10/00 340/6.1 |

(Continued)

FOREIGN PATENT DOCUMENTS

WO      2013063507 A1    5/2013

*Primary Examiner* — Firmin Backer
*Assistant Examiner* — Munear Akki
(74) *Attorney, Agent, or Firm* — Miles & Stockbridge P.C.

(57) ABSTRACT

A system is provided that facilitates communication of haptic notification messages. The system receives a haptic notification message from a tool within a network, where the haptic notification message indicates that the tool has detected an event. The system further determines whether the haptic notification message is a haptic notification message that is required to be transmitted to at least one haptic notification device within the network. The system further transmits the haptic notification message to the at least one haptic notification device using the network in response to a determination that the haptic notification message is a haptic notification message that is required to be transmitted to at least one haptic notification device, where the at least one haptic notification device generates a haptic notification in response to receiving the haptic notification message.

26 Claims, 3 Drawing Sheets

(56) References Cited

U.S. PATENT DOCUMENTS

| | | | |
|---|---|---|---|
| 2006/0273895 A1* | 12/2006 | Kollin | G08B 1/08 340/539.17 |
| 2006/0280207 A1* | 12/2006 | Guarini | H04L 41/0853 370/524 |
| 2007/0087790 A1 | 4/2007 | Worick et al. | |
| 2008/0224883 A1* | 9/2008 | Mock | G08B 25/08 340/6.1 |
| 2009/0021473 A1* | 1/2009 | Grant | G06F 3/016 345/156 |
| 2009/0106655 A1* | 4/2009 | Grant | G06F 1/3231 715/702 |
| 2009/0243852 A1* | 10/2009 | Haupt | G01W 1/00 340/541 |
| 2009/0305744 A1 | 12/2009 | Ullrich | |
| 2010/0023156 A1* | 1/2010 | Trepina | G05B 19/406 700/175 |
| 2010/0082174 A1* | 4/2010 | Weaver | H02J 3/14 700/295 |
| 2010/0289643 A1* | 11/2010 | Trundle | G08C 19/16 340/545.1 |
| 2012/0044062 A1* | 2/2012 | Jersa | H04M 19/047 340/407.1 |
| 2013/0109375 A1* | 5/2013 | Zeiler | H04W 4/029 455/426.1 |
| 2014/0245620 A1 | 9/2014 | Fankhauser et al. | |
| 2015/0097674 A1* | 4/2015 | Mondal | H04W 4/02 340/572.1 |
| 2016/0005295 A1* | 1/2016 | Ikeda | G08B 21/18 340/539.1 |

* cited by examiner

HAPTIC NOTIFICATION COMMUNICATION SYSTEM

FIELD

One embodiment is directed generally to a system, and more particularly, to a system that communicates notification messages to a device.

BACKGROUND

In situations involving power tools, a power tool can have the capability of detecting an event within its environment and notifying a user of the power tool of the event. For example, an electric drill can detect that its battery is about to die, and can notify a user about the low battery using a visual notification (such as displaying a visual indication within a handle of the electric drill) or an audio notification (such as outputting an audible beeping noise). However, providing a notification to the user can be very specific to the user and the specific power tool currently in the hand of the user. Further, problems can arise when there are different user preferences, different tools, and different events that require a notification. It can be difficult to abstract the various notifications for delivery and output. Further, the problems can become more complex if it is necessary to notify multiple users simultaneously about an event detected by the power tool within its environment. Even further, there can be situations (e.g., a noisy or otherwise chaotic environment) where an audio notification or a visual notification is not useful to the user.

SUMMARY

One embodiment is a system that facilitates communication of haptic notification messages. The system receives a haptic notification message from a tool within a network, where the haptic notification message indicates that the tool has detected an event. The system further determines whether the haptic notification message is a haptic notification message that is required to be transmitted to at least one haptic notification device within the network. The system further transmits the haptic notification message to the at least one haptic notification device using the network in response to a determination that the haptic notification message is a haptic notification message that is required to be transmitted to at least one haptic notification device, where the at least one haptic notification device generates a haptic notification in response to receiving the haptic notification message.

BRIEF DESCRIPTION OF THE DRAWINGS

Further embodiments, details, advantages, and modifications will become apparent from the following detailed description of the preferred embodiments, which is to be taken in conjunction with the accompanying drawings.

DETAILED DESCRIPTION

Figure 1:
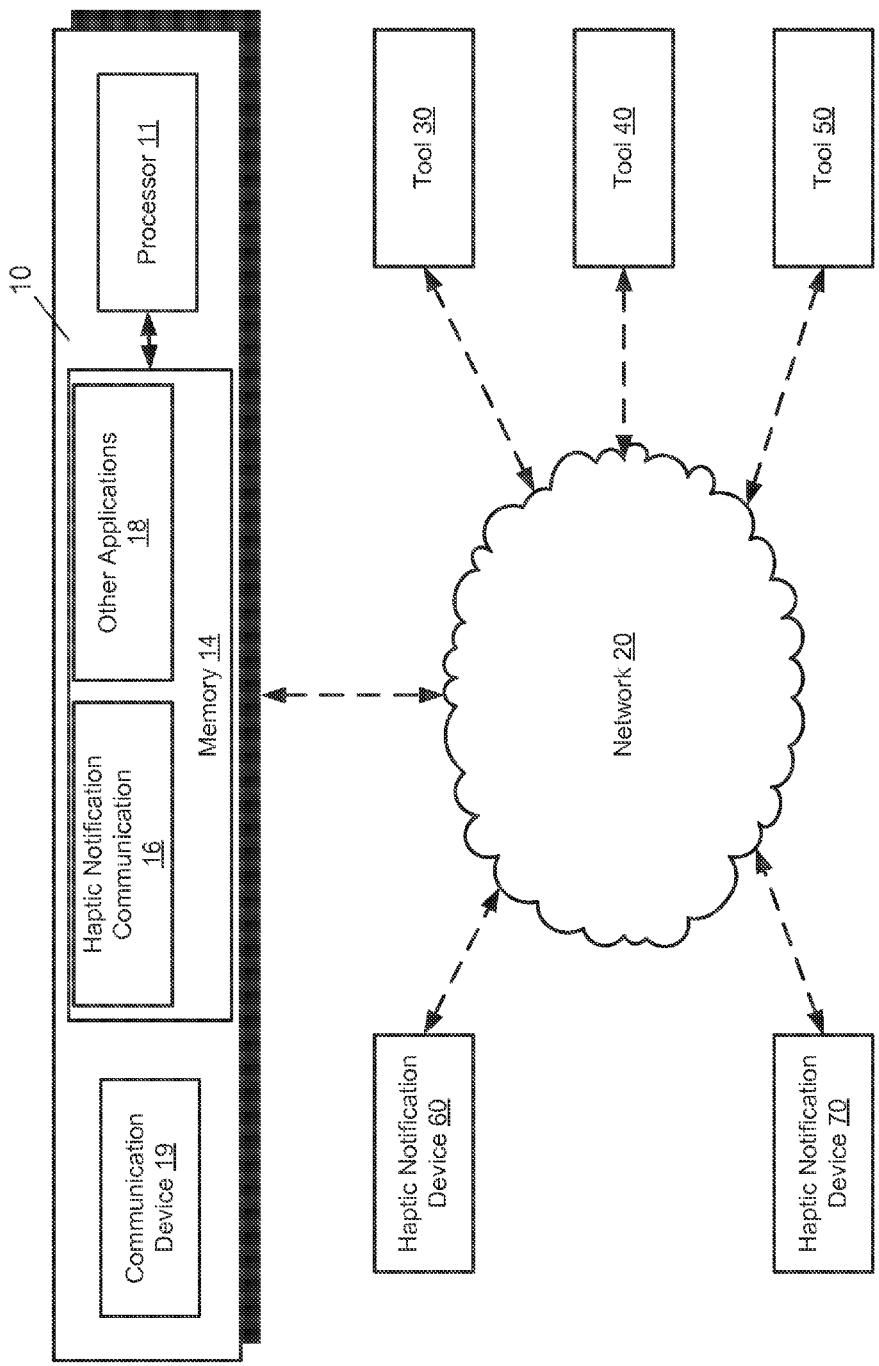
FIG. 1 illustrates a diagram of a haptic notification communication system in accordance with one embodiment of the invention.

In one embodiment, a haptic notification communication system is provided, where the haptic notification communication system can provide a framework of interconnected power tools, where the power tools can communicate with one or more users of the power tools in order to provide haptic effects which can serve as notifications (i.e., "haptic notifications") to the users. The haptic notifications can be provided to the users using haptic notification devices or the power tools themselves. The haptic notification communication system, the power tools and/or the haptic notification devices can be operably connected to each other via a network, such as a computer network or some other type of data network. The power tools can be "intelligent" power tools that can detect their environment and can further provide haptic notification messages to the haptic notification communication system via the network.

The haptic notification communication system can subsequently send the haptic notification messages to the haptic notification devices, where the haptic notification devices can generate haptic effects, such as vibrotactile haptic effects, deformation haptic effects, or electrostatic friction haptic effects. Alternatively, or additionally, the haptic notification communication system can send the haptic notification messages to the other power tools, where the other power tools can also generate haptic effects, such as vibrotactile haptic effects, deformation haptic effects, or electrostatic friction haptic effects. The haptic notification communication system can further determine whether a haptic notification message received from a power tool is a type of haptic notification message that should be propagated to the haptic notification devices and/or the power tools. The haptic notification communication system can also determine which haptic notification devices and/or power tools the haptic notification messages are propagated to.

Thus, in one embodiment, a first power tool detects an event that the first power tool should provide a notification to a first user and a second user. The first user and the second user each have a device registered with a network. As an example, the first user has a second power tool registered with a network, and the second user has a wearable device registered within the network. The first power tool sends a haptic notification message to the second power tool of the first user and the wearable device of the second user. The second power tool and the wearable device each receive the haptic notification message, identify a notification identifier included within the haptic notification message, and generate a haptic notification (e.g., a haptic effect), where the first user experiences the haptic notification through the second power tool, and the second user experiences the haptic notification through the wearable device.

For example, according to an example embodiment, a power tool (e.g., an electric drill) detects that its battery is about to run out of power. The power tool sends a haptic notification message to the haptic notification communication system via a network, where the haptic notification message notifies a user that the battery of the power tool is about to run out of power, and where the haptic notification message is intended to be sent to a first user and a second user. The haptic notification communication system can determine that the haptic notification message is a type of haptic notification message that should be propagated to the first user and the second user. The haptic notification communication system can further determine that the first user and second user each have a haptic notification device registered on the network, where the first user prefers to receive haptic notifications from a haptic notification device that is a wearable device, and the second user prefers to receive haptic notifications from a haptic notification device that is a mobile device.

The haptic notification communication system subsequently sends the haptic notification message via the network to the first user, where the first user receives a haptic notification via the haptic notification device that is a wearable device. More specifically, the wearable device receives the haptic notification message and generates a haptic effect based on the received haptic notification message, where the haptic effect notifies the first user of the detected event. The haptic notification communication system further sends the haptic notification message via the network to the second user, where the second user receives a haptic notification via the haptic notification device that is a mobile device. More specifically, the mobile device receives the haptic notification message and generates a haptic effect based on the received haptic notification message, where the haptic effect notifies the second user of the detected event.

As another example, according to another example embodiment, a power tool (e.g., an electric pan) detects that a pre-determined amount of time (e.g., 10 minutes) has elapsed since the power tool was initiated. The power tool sends a haptic notification message to the haptic notification communication system via a network, where the haptic notification message notifies a user that the pre-determined amount of time has expired, and further indicates that food may burn if the power tool is not turned off, where the haptic notification message is intended to be sent to a first user and a second user.

The haptic notification communication system can further determine that the haptic notification message is a type of haptic notification message that should be propagated to the first user and the second user. The haptic notification communication system sends the haptic notification message via the network to the first user, where the first user receives a haptic notification via the haptic notification device that is a wearable device. More specifically, the wearable device receives the haptic notification message and generates a haptic effect based on the received haptic notification message, where the haptic effect notifies the first user of the detected event. The haptic notification communication system further sends the haptic notification message via the network to the second user, where the second user receives a haptic notification via another power tool (e.g., an electric knife). More specifically, the power tool receives the haptic notification message and generates a haptic effect based on the received haptic notification message, where the haptic effect notifies the second user of the detected event.

As another example, according to another example embodiment, a first worker is using a power tool (e.g., electric drill) to create a hole within a piece of wood. The wood is not as thick as anticipated, and a component of the power tool (e.g., a drill bit of the electrical drill) is about to penetrate the piece of wood. Further, a second worker is standing behind the piece of wood. The power tool sends a haptic notification message to a network to cause the power tool and a wearable haptic notification device of the second user to generate a haptic notification. Both the first worker and the second worker receive haptic notifications. The first worker receives a haptic notification via the power tool. The second worker receives a haptic notification via the wearable haptic notification device.

FIG. 1 illustrates a diagram of a haptic notification communication system 10, in accordance with one embodiment of the invention. Haptic notification communication system 10 can be any type of computer system, such as a server, that provides functionality for facilitating communication of haptic notification messages, as described below in greater detail. Although shown as a single system, the functionality of haptic notification communication system 10 can be implemented as a distributed system. Haptic notification communication system 10 includes a processor 11 configured to process information, where processor 11 can be coupled to a bus or other communication mechanism (not illustrated in FIG. 1) that is configured to communicate information. Processor 11 may be any type of general or specific purpose processor. Haptic notification communication system 10 further includes a memory 14 for storing information and instructions to be executed by processor 11. Memory 14 can be comprised of any combination of random access memory ("RAM"), read only memory ("ROM"), static storage such as a magnetic or optical disk, or any other type of computer-readable medium.

A computer-readable medium may be any available medium that can be accessed by processor 11 and may include both a volatile and nonvolatile medium, a removable and non-removable medium, a communication medium, and a storage medium. A communication medium may include computer readable instructions, data structures, program modules or other data in a modulated data signal such as a carrier wave or other transport mechanism, and may include any other form of an information delivery medium known in the art. A storage medium may include RAM, flash memory, ROM, erasable programmable read-only memory ("EPROM"), electrically erasable programmable read-only memory ("EEPROM"), registers, hard disk, a removable disk, a compact disk read-only memory ("CD-ROM"), or any other form of a storage medium known in the art.

In one embodiment, memory 14 stores software modules that provide functionality when executed by processor 11. The modules include a haptic notification communication module 16 that facilitates communication of haptic notification messages, as disclosed in more detail below. In certain embodiments, haptic notification communication module 16 can comprise a plurality of modules, where each module provides specific individual functionality for facilitating communication of haptic notification messages. Haptic notification communication system 10 will typically include one or more additional application modules 18 to include additional functionality, such as Integrator™ software by Immersion Corporation.

Haptic notification communication system 10 further includes a communication device 19, such as a network interface card, to provide mobile wireless network communication, such as infrared, radio, Wi-Fi, or cellular network communication. In other embodiments, communication device 19 provides a wired network connection, such as an Ethernet connection or a modem.

Haptic notification communication system 10 is further operably coupled to network 20. Network 20 is a computer network that can be directly connected to the Internet, indirectly connected to the Internet, or not connected to the Internet at all. Network 20 can be local access network ("LAN"), a wide access network ("WAN"), a personal area network ("PAN"), a home area network ("HAN"), a campus area network ("CAN"), a metropolitan area network ("MAN"), a global area network ("GAN"), a storage area network ("SAN"), a virtual private network ("VPN"), a wireless network, a wireless LAN, a HomePNA, a power line communication network, a G.hn network, a Bluetooth network, an optical fiber network, an Ethernet network, an active networking network, a client-server network, a peer-to-peer network, a bus network, a star network, a ring network, a mesh network, a star-bus network, a tree network, a hierarchical topology network, or any other type of computer network that is known in the art.

According to the illustrated embodiment, power tools 30, 40, and 50 are also operably coupled to network 20. Power tools 30, 40, and 50 are power tools that are configured to be actuated by a non-manual power source or mechanism, such as an electrical power source or electrical mechanism, and are further configured to detect an external or internal event. Power tools 30, 40, and 50 can be further configured to send haptic notification messages within network 20. Examples of power tools can include: electric drills, electric saws, electric nail guns, electric knives, electric hammers, electric pans, etc. A power tool can also be identified as a "tool" or a "device." Power tools are further described below in greater detail in conjunction with FIG. 2. One of ordinary skill in the art would readily appreciate that the number of power tools operably coupled to network 20 is an example number according to the example embodiment, and that in alternate embodiments, any number of power tools can be operably coupled to network 20.

According to the illustrated embodiment, haptic notification devices 60 and 70 are also operably coupled to network 20. Haptic notification devices 60 and 70 are devices that are "haptically enabled," meaning they include a mechanism to generate haptic effects which can serve as haptic notifications to a user. Haptic notification devices 60 and 70 can be further configured to receive haptic notification messages from power tools 30, 40, and 50 via network 20, and to generate haptic notifications in response to, and based on, the haptic notification messages. One type of a haptic notification device can be a mobile device. Examples of mobile devices can include: smartphones; tablets; laptop computers; personal computers; personal digital assistants ("PDAs"), etc. Another type of haptic notification device can be a wearable device. Examples of wearable devices can include: wrist bands, headbands, eyeglasses, rings, leg bands, arrays integrated into clothing, other types of device that a user may wear on a body or that can be held by a user, etc. Haptic notification devices are further described below in greater detail in conjunction with FIG. 2. One of ordinary skill in the art would readily appreciate that the number of haptic notification devices operably coupled to network 20 is an example number according to the example embodiment, and that, in alternate embodiments, any number of haptic notification devices can be operably coupled to network 20. Further, in an alternate embodiment, a haptic notification device can be replaced by a power tool, where the power tool is configured to receive haptic notification messages from power tools 30, 40, and 50 via network 20, and to generate haptic notifications in response to, and based on, the haptic notification messages.

According to an embodiment, haptic notification communication system 10 can register power tools 30, 40, and 50 with network 20 by assigning a unique power tool identifier to power tools 30, 40, and 50. In one embodiment, the unique power tool identifier can be an Internet protocol ("IP") address of a power tool. Further, according to the embodiment, haptic notification communication system 10 can further register haptic notification devices 60 and 70 with network 20 by assigning a unique haptic notification device identifier to haptic notification devices 60 and 70. In one embodiment, the unique haptic notification device identifier can be an IP address of the haptic notification device.

Further, according to an embodiment, haptic notification communication system 10 can facilitate communication of haptic notification messages between power tools 30, 40, and 50, and haptic notification devices 60 and 70. More specifically, haptic notification communication system 10 can receive haptic notifications messages that are sent by power tools 30, 40, and 50 via network 20. Haptic notification communication system 10 can further determine whether the haptic notification messages are required to be propagated, or otherwise transmitted, to other entities within network 20 (e.g., any of power tools 30, 40, and 50, and haptic notification devices 60 and 70). In one embodiment, each haptic notification message includes a notification type, and haptic notification communication system 10 can determine the notification type of each haptic notification message. Haptic notification communication system 10 can further compare the determined notification type of each haptic notification message with a pre-defined set of notification types, where the pre-defined set of notification types defines a set of haptic notification messages that are required to be transmitted to one, some, or all of the other entities within network 20 (e.g., any of power tools 30, 40, and 50, and haptic notification devices 60 and 70) via network 20. In response to a determination that the haptic notification messages are required to be transmitted, haptic notification communication system 10 can further send the haptic notification messages to any of the other entities within network 20 (e.g., any of power tools 30, 40, and 50, and haptic notification devices 60 and 70) via network 20. The communication of haptic notification messages is further described below in greater detail in conjunction with FIG. 2.

In accordance with the embodiment, haptic notification communication system can establish a communication protocol via a format of the haptic notification messages. In one embodiment, a format of a haptic notification message can include a notification identifier that is a unique identifier that uniquely identifies the haptic notification message. Further, according to the embodiment, the notification identifier can include a notification type identifier that identifies a notification type of the haptic notification message. Further, in one embodiment, the format of the haptic notification message can further include one or more haptic notification device identifiers that identify intended recipients of the haptic notification message, where the intended recipients are haptic notification devices. Additionally, or alternatively, the format of the haptic notification message can further include one or more power tool identifiers that identify intended recipients of the haptic notification message, where the intended receipts are other power tools. A format of a haptic notification message is further described below in greater detail in conjunction with FIG. 2.

In one embodiment, as previously described, haptic notification communication system 10 can compare a determined notification type of each haptic notification message with a pre-defined set of notification types. According to the embodiment, haptic notification communication system 10 can define the set of notification types to include types of notifications that notify a user of an event involving a power tool that could require a user's attention. An example set of notification type that can be defined by haptic notification communication system 10 as a pre-defined set of notification types can include the following notifications in one example embodiment: a notification of a status of a power tool (e.g., battery dying, power tool overheating etc.); a notification to stop drilling, or performing some other action, after an electric drill, or some other power tool, has reached a target distance; a notification to prevent the user from performing an action with a power tool (e.g., stripping a screw, etc.); a safety-based notification (e.g., the power tool is about to break, a user's thumb is too close to the power tool, etc.); a notification that a component of a power tool (e.g., bit, saw, etc.) is dull, or otherwise needs to be replaced; a notification that a component of a power tool (e.g., screw, etc.), is not a correct size (e.g., too long, etc.) for an intended action; a notification that an obstruction (e.g., a knot, a nail, etc.) has been detected by a power tool; or a notification that a component of a power tool (e.g., bit, screw, saw, etc.) is overheating. A pre-defined set of notification types is further described below in greater detail in conjunction with FIG. 2.

Further, in accordance with the embodiment, an entity within network 20 (e.g., any of power tools 30, 40, and 50, and haptic notification devices 60 and 70) can generate an appropriate haptic notification (e.g., an appropriate haptic effect) to a user based on the received haptic notification message. The entity can receive the haptic notification message and determine a notification identifier of the haptic notification message. The entity can further determine a notification type of the haptic notification message, where the notification type can be included within the notification identifier. The entity can then select an appropriate haptic notification (e.g., an appropriate haptic effect) based on the determined notification type, and can then generate the selected haptic notification (e.g., the selected haptic effect) to the user. The generation of the haptic notification is further described below in greater detail in conjunction with FIG. 2.

Figure 2:
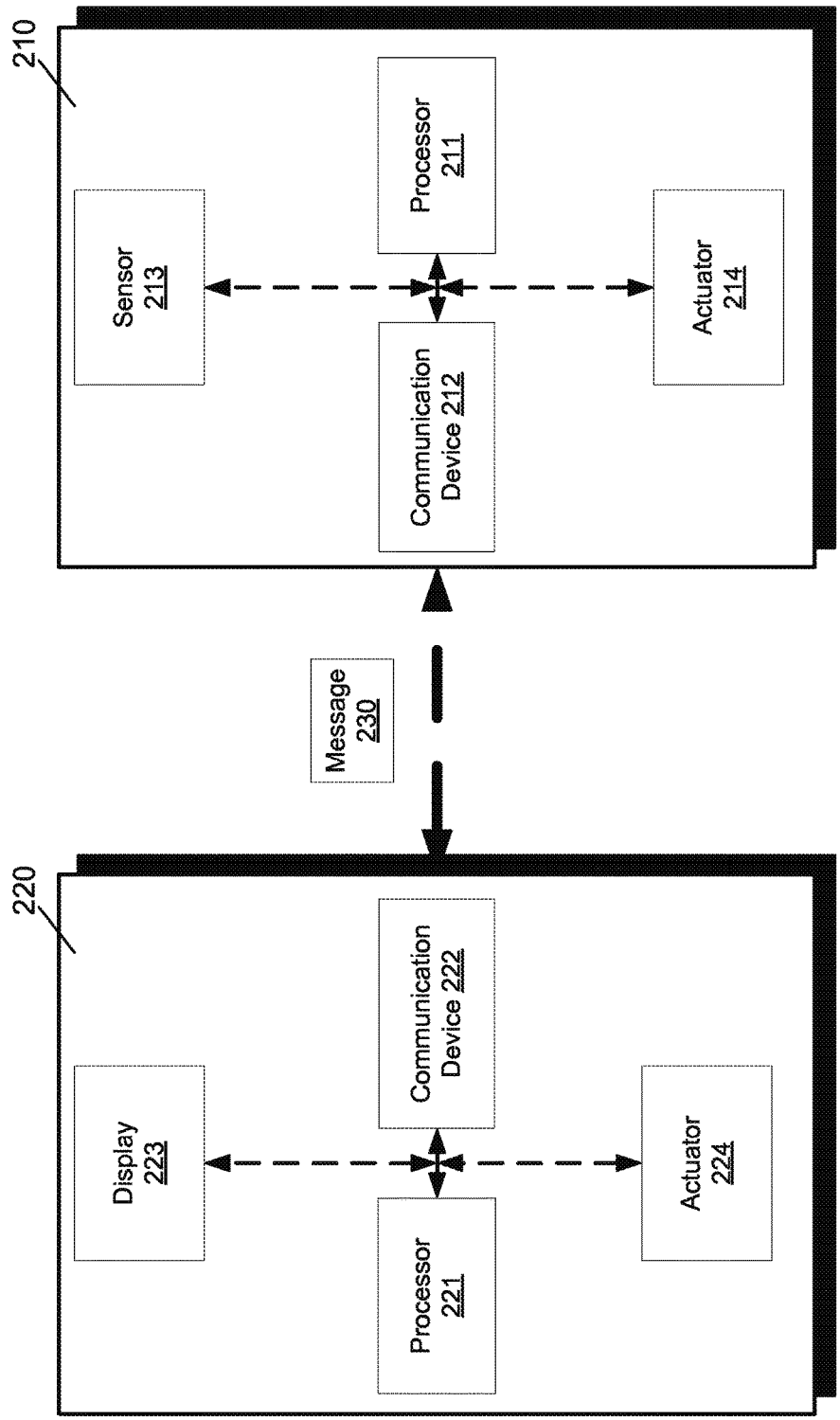
FIG. 2 illustrates a diagram of a communication between a power tool and a haptic notification device, according to an embodiment of the invention.

FIG. 2 illustrates a diagram of a communication between a power tool 210 and a haptic notification device 220, according to an embodiment of the invention. Power tool 210 is a power tool as previously described in conjunction with FIG. 1. In one embodiment, power tool 210 can be identical to one of power tools 30, 40, or 50 of FIG. 1. Power tool 210 includes a processor 211 configured to process information, where processor 211 can be coupled to a bus or other communication mechanism (not illustrated in FIG. 2) that is configured to communicate information. Processor 211 may be any type of general or specific purpose processor. Power tool 210 further includes a communication device 212, such as a network interface card, to provide mobile wireless network communication, such as infrared, radio, Wi-Fi, or cellular network communication. In other embodiments, communication device 212 provides a wired network connection, such as an Ethernet connection or a modem.

Power tool 210 further includes a sensor 213. Sensor 213 can be configured to detect a form of energy, or other physical property, such as, but not limited to, sound, movement, acceleration, bio signals, distance, flow, force/pressure/strain/bend, humidity, linear position, orientation/inclination, radio frequency, rotary position, rotary velocity, manipulation of a switch, temperature, vibration, or visible light intensity. Sensor 213 can further be configured to convert the detected energy, or other physical property, into an electrical signal, or any signal that represents virtual sensor information. Sensor 213 can be any device, such as, but not limited to, an accelerometer, an electrocardiogram, an electroencephalogram, an electromyograph, an electrooculogram, an electropalatograph, a galvanic skin response sensor, a capacitive sensor, a hall effect sensor, an infrared sensor, an ultrasonic sensor, a pressure sensor, a fiber optic sensor, a flexion sensor (or bend sensor), a force-sensitive resistor, a load cell, a LuSense $CPS^2$ 155, a miniature pressure transducer, a piezo sensor, a strain gage, a hygrometer, a linear position touch sensor, a linear potentiometer (or slider), a linear variable differential transformer, a compass, an inclinometer, a magnetic tag (or radio frequency identification tag), a rotary encoder, a rotary potentiometer, a gyroscope, an on-off switch, a temperature sensor (such as a thermometer, thermocouple, resistance temperature detector, thermistor, or temperature-transducing integrated circuit), microphone, photometer, altimeter, bio monitor, camera, or a light-dependent resistor. In alternate embodiments, tool 210 can include one or more additional sensors, in addition to sensor 213 (not illustrated in FIG. 2). In some of these embodiments, sensor 213 and the one or more additional sensors may be part of a sensor array, or some other type of collection of sensors.

In one embodiment, power tool 210 can further include an actuator 214. Processor 211 may transmit a haptic signal associated with a generated haptic effect to actuator 214, which in turn outputs haptic effects such as vibrotactile haptic effects, electrostatic friction haptic effects, or deformation haptic effects. Actuator 214 includes an actuator drive circuit. Actuator 214 may be, for example, an electric motor, an electro-magnetic actuator, a voice coil, a shape memory alloy, an electro-active polymer, a solenoid, an eccentric rotating mass motor ("ERM"), a linear resonant actuator ("LRA"), a piezoelectric actuator, a high bandwidth actuator, an electroactive polymer actuator ("EAP actuator"), a macro fiber composite actuator ("MFC actuator"), an electrostatic friction display, or an ultrasonic vibration generator. In alternate embodiments, tool 210 can include one or more additional actuators, in addition to actuator 214 (not illustrated in FIG. 2). Actuator 214 is an example of a haptic output device, where a haptic output device is a device configured to output haptic effects, such as vibrotactile haptic effects, electrostatic friction haptic effects, or deformation haptic effects, in response to a drive signal. In alternate embodiments, actuator 214 can be replaced by some other type of haptic output device.

Haptic notification device 220 is a device that is haptically enabled and that generates haptic notifications in response to, and based on, received haptic notification messages as previously described in conjunction with FIG. 1. In one embodiment, haptic notification device 220 can be identical to one of haptic notification devices 60 or 70 of FIG. 1. Haptic notification device 220 includes a processor 221 configured to process information, where processor 221 can be coupled to a bus or other communication mechanism (not illustrated in FIG. 2) that is configured to communicate information. Processor 221 may be any type of general or specific purpose processor. Haptic notification device 220 further includes a communication device 222, such as a network interface card, to provide mobile wireless network communication, such as infrared, radio, Wi-Fi, or cellular network communication. In other embodiments, communication device 222 provides a wired network connection, such as an Ethernet connection or a modem.

In one embodiment, haptic notification device 220 can include a display 223 such as a Liquid Crystal Display ("LCD"), for displaying a graphical representation or user interface to a user. The display 223 may be a touch-sensitive input device, such as a touch screen, configured to send and receive signals from processor 221, and may be a multi-touch touch screen.

Haptic notification device 220 further includes an actuator 224. Processor 221 may transmit a haptic signal associated with a generated haptic effect to actuator 224, which in turn outputs haptic effects such as vibrotactile haptic effects, electrostatic friction haptic effects, or deformation haptic effects. In alternate embodiments, haptic notification device 220 can include one or more additional actuators, in addition to actuator 224 (not illustrated in FIG. 2). Actuator 224 is an example of a haptic output device, where a haptic output device is a device configured to output haptic effects, such as vibrotactile haptic effects, electrostatic friction haptic effects, or deformation haptic effects, in response to a drive signal. In alternate embodiments, actuator 224 can be replaced by some other type of haptic output device.

According to an embodiment, sensor 213 of power tool 210 can be configured to detect an event. More specifically, sensor 213 can be configured to detect an environment of power tool 210 and can further be configured to detect an event that occurs within the environment. The event can be external to power tool 210 or internal to power tool 210. A list of example events that can be detected by sensor 213 of power tool 210 can include the following events, in one example embodiment: a change in one or more characteristics of power tool 210 or a component of power tool 210 (e.g., a battery of power tool 210 dying, power tool 210 overheating, power tool 210 is about to break, etc.); a movement of power tool 210 to a target distance; an occurrence of an object within a pre-determined distance of power tool 210; a disparity in size of a component of power tool 210 in relation to an intended action of power tool 210; or an occurrence of a user within a pre-determined distance of power tool 210.

An expanded list of example events is provided below, in accordance with an example embodiment:

| Problem | Professional solution | Novice Solutions | Degree/source of frustration |
| --- | --- | --- | --- |
| Drilling a straight line (hole) | Maintain the drill in a straight line. This skill increases with practice | Drilling a straight line is a big problem for novice users, most likely they will not get it from the first time (they would probably need more than one try) | You have to align on x and y axis while moving forward in the z axis. Bubble and laser solution only align the drill on the y-axis. Some drills are not ninety degrees by nature, which complicates alignment. If the hole is not straight, this could cause problems when aligning two holes together |
| Drilling a straight line (screw) | Align bit with screw horizontally (or vertically depending on the direction of where the drilling is required) into the wood | Same as above | The screw will not go in straight. It might cause damages and it might not go in completely, it will be tilted. Stripping a screw |
| Drilling to a certain point (e.g. 2 inches deep) | Place tape on the bit, and drill fast at the beginning slower near the end. | Rely mostly on vision. Will not be able to get precise measurement | Dust could impair vision. Moreover the tape on the screw might fly off. |
| Stripping the screw | Make sure the bit is completely inside the screw and that it is straight. Rely on noise and jitter of the drill to see when to stop. (High quality bits and screws reduce damaging the screws). | Go with a slower speed. Stop and check constantly | Difficult to get the screw out once it is in. |
| Drill slips out of the screw while operating. | Align bit with screw Make sure the bit is completely inside the screw. Use sharp bits. Going slower sometimes | N/A | Injuries mainly. The drill could cause damage to the wood (when it drills in a different place). |
| Screw (or bit) is too long and it penetrates through the wood (or stud) | For studs, when hitting a concrete wall, the drill stops going through and they have to remove it and start fresh (new hole). Sometimes they see the screw going out the other side (when it is not a stud). | N/A | N/A |
| Dull bits or blades | Change the bit or blade. Sometimes this could be detected visually, other times from the extra force they have to apply (this could also lead to breaking the bit). | Usually they would not do anything because they own one set of accessories | Good bit fitted perfectly there is less vibrations, it is more comfortable, and it screws easily (for holes). For screws dull bits will strip the screw faster With an electric saw, dull blades make it jitters or vibrates causing the cut to become difficult. |

-continued

| Problem | Professional solution | Novice Solutions | Degree/source of frustration |
| --- | --- | --- | --- |
| Missing the stud location and drilling in gyprock | When the drill rotates continuously without resistance, they would know it's a wrong place and should change the location | Novice users are sometimes unaware they have to drill in the stud. They use plastic housing for the screws. | The intended place to drill is the stud, not the empty space between them. A stud finder would help but it is an extra device they have to carry on them. |
| Overdriving screw in drywall | Requires a really low speed setting (clutch) to prevent the overdrive. On the other hand ply wood needs a high clutch setting | Probably not a real concern for novice users. | The screw goes inside the wall causing a slight damage in the wall |
| Centering bit into a chuck | Nice when the chuck blocks making a sound. They rotate the chuck until they here the click. | N/A | Definitely a problem for novice users. |
| Breaking the bit while drilling | Replace the bit after it is broken. Professionals usually have separate drill with bit set for drilling into concrete. Bur for a hole or two and for convenience, they use the regular set. Hence some will break. | Placing the bit into the chuck incorrectly by novice users increases the chances of breaking the bit. | Sometimes a bit is not as strong as it should be, especially when digging through concrete. |
| Encountering a solid nail in the wood while drilling | No easy way to check for nails. Visual alertness sometimes help | Same as professionals | The drill could hit the nail causing injuries. |
| Forgetting to lock the drill switch | They hear or feel the vibration when inserting the drill on their belt then turn it off | N/A | If they don't hear the vibrations of the drill, this could drain the battery |
| Battery dying | There is no workaround for this, batteries eventually die. There are two types, however, one that dies gradually and one that dies instantaneously. Some professionals prefer the former, while others prefer the latter. | Novice users usually acquire two batteries with their drill to replace one when the other dies. | The one that dies instantaneously provide maximum power up until it dies. The maximum power is useful for certain jobs. The other type reduces the power gradually so the drill will not be as powerful throughout, but if you need a small push like drilling half a screw it will be useful. |
| Heated screws and bits. | You need to go slower at the beginning then gradually increase the speed (metal screws heat the bit). | N/A | When drilling through metal, or using metal screws, the end of the bit becomes too hot and it could get ruined. |
| LED light | Some drills have better location for LED light to view working areas in dark places | N/A | LED is placed near the chuck sometimes rendering it ineffective. It is better if it is placed near the battery. |
| Drilling (screwing) a knot in the wood | Replace a bit with stronger one. | Probably will keep trying with the same bit. If a battery dies while operating rotating replace and keep going. | Knot in the wood difficult to go through It'll be harder on the saw and harder on the drill |
| Safety Concerns | Use goggles and precautions for e.g. when operating the electrical saw. Gloves are NOT recommended | Some uses goggles | There are some dangerous situation that could be avoided with experience. Most novice users are afraid to operate a saw, for safety reasons. |

-continued

| Problem | Professional solution | Novice Solutions | Degree/source of frustration |
|---|---|---|---|
| Cutting Straight with a circular saw | Comes almost natural with practice. Always mark the wood with a chalk or pencil. There are also alignment markers that you put on the wood. Some professionals use T-Square, ply wood straight peace for alignment with clamps on the wood. Some hobbyists use saws with straight laser beams. | Few novice users operate the saw for big cuts. For small cuts, cutting straight is not a big concern. | Too much deviation will ruin the wood or metal they are cutting. While deviation the circular saw will jump back at you. Without a guide it is very hard to cut a straight line. |
| Encountering a solid nail in the wood while sawing | No easy way to check for nails. Visual alertness sometimes help | Same as professionals | The blades are intended for wood (There are other blades designed to cut metal). The metal nail will ruin the blade. The spark produced from cutting the nail is dangerous to the eyes. |
| Cutting shapes with jigsaw | N/A | N/A | N/A |
| Nail gun: forgetting to change nail size for the current job | After each jobs professionals should change the nails according to the new job | Novice users use the hammer mainly, not the nail gun | The nail will go through the wood if it is long, the nail could injure the worker if his/her hand is behind the wood |
| Nail gun hitting a knot in the wood | The worker should pay visual attention for knots in the wood | Novice users use the hammer mainly, not the nail gun | The nail would break the knot and could injure the worker |
| Biometric signal related to user of power tool Environment signal related to environment of user of power tool (e.g., carbon dioxide, heat generated from fire, etc.) | N/A | N/A | N/A |

In response to the event detected by sensor 213, power tool 210 can generate haptic notification message 230. Haptic notification message 230 is a message that indicates that sensor 213 of power tool 210 has detected the specific event. In accordance with an embodiment, haptic notification message 230 can include a notification identifier that uniquely identifies haptic notification message 230. According to the embodiment, the notification identifier can include a notification type identifier that identifies a notification type of haptic notification message 230, where a notification type identifies a type of event detected by power tool 210, and where the notification type further identifies the type of notification that is to be communicated to a user. Further, in accordance with an embodiment, haptic notification message 230 can include one or more haptic notification device identifiers that uniquely identify one or more haptic notification devices that are intended recipients. Additionally, or alternatively, haptic notification message 230 can include one or more power tool identifiers that uniquely identify one or more power tools that are intended recipients. An example format of haptic notification message 230 is provided below, in accordance with an example embodiment:

```
[notification identifier (including notification type identifier)
    haptic notification device identifier 1
    haptic notification device identifier 2
    ...
    haptic notification device identifier x
    power tool identifier 1
    power tool identifier 2
    ...
    power tool identifier x]
```

In the illustrated embodiment, haptic notification message 230 can include a haptic notification device identifier that uniquely identifies haptic notification device 220.

After generating haptic notification message 230, communication device 212 of power tool 210 can send haptic notification message 230 to a haptic notification communication system (not illustrated in FIG. 2) via a network (also not illustrated in FIG. 2), where power tool 210 and haptic notification device 220 are registered with the network. After receiving haptic notification message 230, the haptic notification communication system can determine whether haptic notification message 230 should be transmitted to one or more devices that are registered within the network, such as haptic notification device 220.

In one embodiment, the haptic notification communication system can retrieve a notification type identifier from a notification identifier of haptic notification message 230, and can further determine a notification type of haptic notification message 230 based on the received notification type identifier. The haptic notification communication system can further compare the determined notification type of haptic notification message 230 with a pre-defined set of notification types, where the pre-defined set of notification types defines a set of haptic notification messages that should be transmitted to a haptic notification device (such as haptic notification device 220) via the network. In one embodiment, the set of haptic notification messages that should be transmitted to a haptic notification device can include haptic notification messages that notify users of events detected by a sensor of a power tool (e.g., sensor 213 of power tool 210) that are deemed to be significant events that require a haptic notification be sent to one or more users. Such significant events can include the example events previously described above, and thus, the set of haptic notification messages can include haptic notification messages that notify users of the example events previously described above. If the determined notification type is within the pre-defined set of notification types, the haptic notification communication system can determine that haptic notification message 230 should be transmitted to one or more devices. If the determined notification type is not within the pre-defined set of notification types, the haptic notification communication system can determine that haptic notification message 230 should not be transmitted to one or more devices.

Further, if haptic notification message 230 should be transmitted to one or more devices, the haptic notification communication system can also determine which device (or devices) that is (or are) registered within the network should receive haptic notification message 230. In certain embodiments, the haptic notification communication system can retrieve one or more haptic notification device identifiers included within haptic notification message 230 and can further determine to send haptic notification message 230 to one or more haptic notification devices uniquely identified by the one or more haptic notification device identifiers. In the illustrated embodiment, the haptic notification communication system can retrieve a haptic notification device identifier from haptic notification message 230 that uniquely identifies haptic notification device 220 and can determine to send haptic notification message 230 to haptic notification device 220. Additionally, or alternatively, the haptic notification communication system can retrieve one or more power tool identifiers included within haptic notification message 230 and can further determine to send haptic notification message 230 to one or more power tools uniquely identified by the one or more power tool identifiers. In alternate embodiments, the haptic notification communication system can further determine a notification type of haptic notification message 230 based on a received notification type identifier, and can further determine to send haptic notification message 230 to one or more haptic notification devices and/or one or more power tools based on the notification type of haptic notification message. In the illustrated embodiment, the haptic notification communication system can retrieve a notification type identifier from haptic notification message 230 that identifies a notification type of haptic notification message, can further determine that the notification type indicates that haptic notification message should be transmitted to haptic notification device 220, and can further determine to send haptic notification message 230 to haptic notification device 220.

Once the haptic notification communication system determines that haptic notification message 230 should be transmitted to haptic notification device 220, the haptic notification communication system sends haptic notification message 230 to haptic notification device 220 via the network. Upon receiving haptic notification message 230 via communication device 222, haptic notification device 220 generates a haptic notification that can be experienced by a user. More specifically, processor 221 of haptic notification device 220 generates a haptic signal, sends the haptic signal to actuator 224, and causes actuator 224 to generate one or more haptic effects. Example haptic effects include: a vibrotactile haptic effect that causes a vibration within haptic notification device 220; a deformation haptic effect that causes a deformation within haptic notification device 220; or an electrostatic friction haptic effect that causes a force to be applied to haptic notification device 200. In one embodiment, processor 221 can cause actuator 224 to generate one or more specific haptic effects based on a notification type of haptic notification message 230.

In an alternate embodiment, power tool 210 can receive, rather than send, haptic notification message 230 via communication device 212. In this alternate embodiment, power tool 210 can generate a haptic notification that can be experienced by a user. More specifically, processor 211 of power tool 210 generates a haptic signal, sends the haptic signal to actuator 214, and causes actuator 214 to generate one or more haptic effects. Example haptic effects include: a vibrotactile haptic effect that causes a vibration within power tool 210 (e.g., within a motor or handle of power tool 210); a deformation haptic effect that causes a deformation within power tool 210 (e.g., within a handle of power tool 210); or an electrostatic friction haptic effect that causes a force to be applied to power tool 210 (e.g., within a handle of power tool 210). In one embodiment, processor 211 can cause actuator 214 to generate one or more specific haptic effects based on a notification type of haptic notification message 230.

Thus, according to an example embodiment, a plurality of users are registered with a specific network. The registration can be done based on a presence of the users within a specified coverage of the network. More specifically, each user can be registered through his or her preferred haptic notification device (e.g., mobile device, wearable device, etc.), where each user possesses the corresponding haptic notification device, and where each haptic notification device is registered with the network using a unique haptic notification device identifier. As the users are working, a safety hazard that is caused by a power tool (e.g., a jackhammer) is also detected by the power tool. The power tool can send haptic notification messages that alert the users regarding the safety hazard to the users registered with the network. Each user registered within the network can receive a haptic notification informing the user of the safety hazard on his or her preferred haptic notification device.

According to another example embodiment, a first user, a second user, and a third user can share a single power tool (e.g., an electric saw) within a construction site. The first, second, and third users each also possess a haptic notification device registered with a network. Upon a detection of the power tool that its battery is dying, the power tool can send a haptic notification message to the haptic notification devices of the first, second, and third users within the network. Each haptic notification device can generate a haptic notification that is experienced by the first user, the second user, and the third user.

According to another example embodiment, a first user is using a power tool (e.g. an electric drill) to power drill through a wood piece, and the second user is painting the wood piece from the other side, where the power tool, the first user, and the second user are connected within a network. The power tool can detect a thickness of the wood piece, and can determine when the end of the wood piece would be reached before a component (e.g., a drill bit) of the power tool penetrates to the other side of the wood piece. Based on the proximity of the two users to the power tool, the power tool can decide to send a haptic notification message to the two users when it is about to penetrate to the other side of the wood piece. The power tool can determine there is no need to send the haptic notification message to other users on the network, because the proximity of the other users, in relation to the power tool, is such that the other users will not be affected by the power tool penetrating the other side of the wood piece. Based on the haptic notification message, the first user can receive a haptic notification via a handle of the power tool, and the second user can receive a separate haptic notification via a wearable device. In this example embodiment, the first user can stop the drilling in response to receiving the haptic notification, and the second user can take precautions in case the drill bit reaches the other side of the wood piece in response to receiving the haptic notification.

Figure 3:
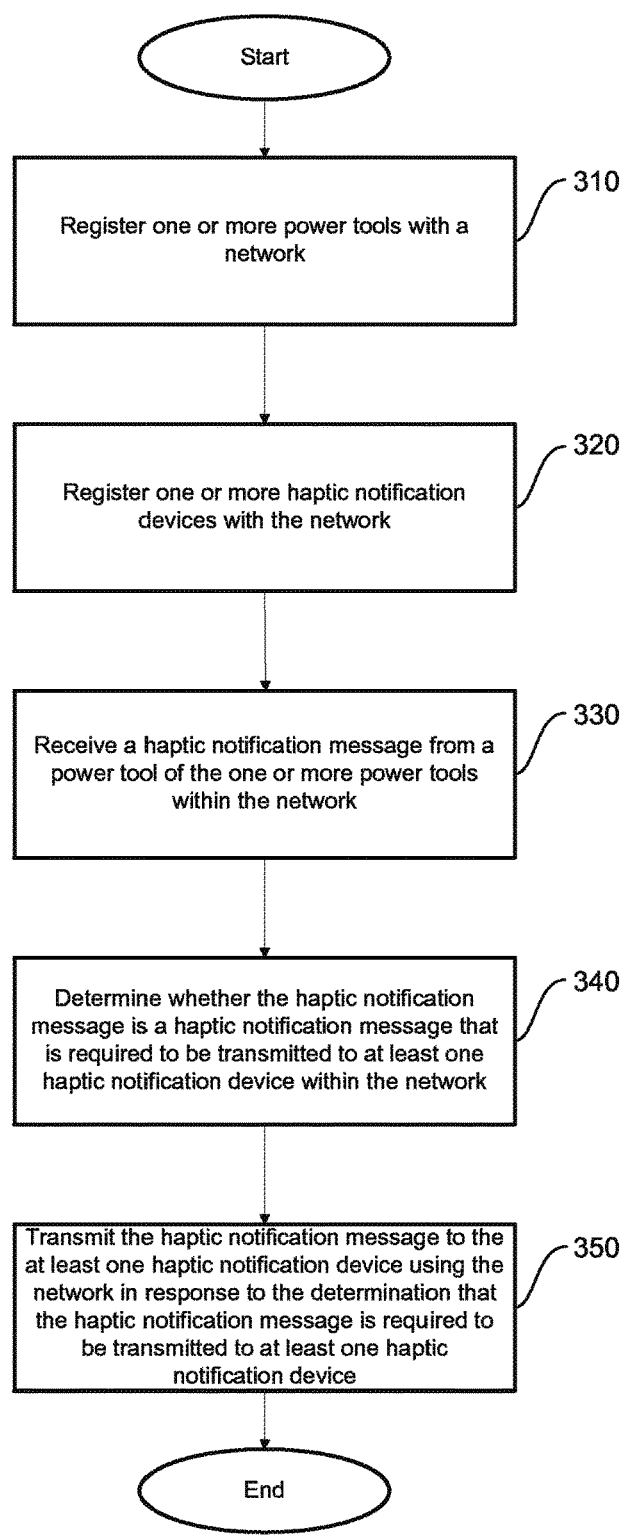
FIG. 3 illustrates a flow diagram of the functionality of a haptic notification communication module, according to an embodiment of the invention.

FIG. 3 illustrates a flow diagram of the functionality of a haptic notification communication module (such as haptic notification communication module 16 of FIG. 1), according to an embodiment of the invention. In one embodiment, the functionality of FIG. 3 is implemented by software stored in memory or other computer-readable or tangible media, and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software. In certain embodiments, some of the functionality can be omitted.

The flow begins and proceeds to 310. At 310, one or more power tools are registered with a network. In certain embodiments, one or more unique power tool identifiers can be assigned to the one or more power tools. Further, in some of these embodiments, a power tool identifier can be an IP address of a power tool. Even further, in some of these embodiments, a power tool can be one of: an electric drill; an electric saw; an electric nail gun; an electric knife; or an electric hammer. The flow then proceeds to 320.

At 320, one or more haptic notification devices are registered with the network. In certain embodiments, one or more unique haptic notification device identifiers can be assigned to the one or more haptic notification devices. Further, in some of these embodiments, a haptic notification device identifier can be an IP address of a haptic notification device. Even further, in some of these embodiments, a haptic notification device can be one of: a mobile device configured to generate haptic effects, a wearable device configured to generate haptic effects, or another power tool. The flow then proceeds to 330.

At 330, a haptic notification message is received from a power tool of the one or more power tools within the network, where the haptic notification message indicates that the power tool has detected an event. In certain embodiments, the haptic notification message can include a notification identifier. Further, in some of those embodiments, the haptic notification message can further include at least one haptic notification device identifier. Even further, in certain embodiments, the power tool can also generate a haptic notification in response to the power tool detecting the event. In some embodiments, the event can be one of: a change in one or more characteristics of the power tool or a component of the power tool; a movement of the power tool to a target distance; an occurrence of an object within a pre-determined distance of the power tool; a disparity in size of a component of the power tool in relation to an intended action of the power tool; or an occurrence of a user within a pre-determined distance of the power tool. The flow then proceeds to 340.

At 340, it is determined whether the haptic notification message is a haptic notification message that is required to be transmitted to at least one haptic notification device of the one or more haptic notification devices within the network. In certain embodiments, a notification type of the haptic notification message can be determined based on the notification identifier included within the haptic notification message. Further, it can be determined whether the notification type is within a pre-defined set of one or more notification types. Event further, in some embodiments, it can be determined whether the at least one haptic notification device is registered with the network based on the at least one haptic notification device identifier included within the haptic notification message. The flow then proceeds to 350.

At 350, the haptic notification message is transmitted to the at least one haptic notification device using the network in response to a determination that the haptic notification message is a haptic notification message that is required to be transmitted to at least one haptic notification device. The at least one haptic notification device generates a haptic notification in response to receiving the haptic notification message. In certain embodiments, the haptic notification includes a haptic effect. Further, in some of these embodiments, the haptic effect can be based on the notification type. Even further, in some of these embodiments, the haptic effect can be one of: a vibrotactile haptic effect; a deformation haptic effect; or an electrostatic friction haptic effect. Further, in some embodiments, the haptic notification message can be transmitted to at least one other power tool of the one or more power tools using the network. In these embodiments, the at least one other power tool can generate a haptic notification in response to receiving the haptic notification message. The flow then ends.

Thus, in accordance with an embodiment, a haptic notification communication system can provide a framework that facilitates communication of haptic notification messages generated by one or more power tools via a network to one or more devices, and that facilitates haptic notifications that are experienced by one or more users using the one or more devices. The haptic notification communication system can further control the propagation of haptic notification messages to specific devices based on detection of specific events by the one or more power tools. In one embodiment, the haptic notification communication system can allow users of power tools to collaborate more easily. For example, different users that are working on the same project, but that are located a significant distance apart from each other, can collaborate and to each other when to start or stop a task, even when their work environment is noisy and verbal communication is not feasible. Further, multiple power tools can be used with ease by users because every new power tool can be connected to the network and associated with a specific user. Thus, the haptic notification communication system can facilitate the use of multiple power tools in separate and distinct locations.

The features, structures, or characteristics of the invention described throughout this specification may be combined in any suitable manner in one or more embodiments. For example, the usage of "one embodiment," "some embodiments," "certain embodiment," "certain embodiments," or other similar language, throughout this specification refers to the fact that a particular feature, structure, or characteristic described in connection with the embodiment may be included in at least one embodiment of the present invention. Thus, appearances of the phrases "one embodiment," "some embodiments," "a certain embodiment," "certain embodiments," or other similar language, throughout this specification do not necessarily all refer to the same group of embodiments, and the described features, structures, or characteristics may be combined in any suitable manner in one or more embodiments.

One having ordinary skill in the art will readily understand that the invention as discussed above may be practiced with steps in a different order, and/or with elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

We claim:

1. A non-transitory computer-readable medium having instructions stored thereon that, when executed by a processor, cause the processor to facilitate communication of haptic notification messages between a tool and a set of two or more haptic notification devices, the instructions comprising:
   receiving, at a haptic messaging controller, a haptic notification message from the tool within a network, wherein the haptic notification message indicates that the tool has detected an event identifying one or more operational characteristics of the tool;
   determining, based on a notification type of the haptic notification message, whether the haptic notification message is to be transmitted to a subset of haptic notification devices within the network; and
   transmitting the haptic notification message to the subset of haptic notification devices according to identifiers included in the haptic notification message that identify the subset of haptic notification devices as recipients;
   wherein the subset of haptic notification devices generate respective haptic notifications in response to receiving the haptic notification message.

2. The non-transitory computer-readable medium of claim 1, the instructions further comprising:
   registering the tool with the network; and
   registering the set of haptic notification devices with the network.

3. The non-transitory computer-readable medium of claim 2,
   wherein the registering the tool within the network further comprises assigning a unique tool identifier to the tool; and
   wherein the registering the set of haptic notification devices within the network further comprises assigning a unique haptic notification device identifier to each haptic notification device.

4. The non-transitory computer-readable medium of claim 1, wherein the haptic notification comprises a haptic effect.

5. The non-transitory computer-readable medium of claim 4, wherein the haptic notification message comprises a notification identifier.

6. The non-transitory computer-readable medium of claim 5, wherein the determining whether the haptic notification message is to be transmitted to the subset of haptic notification devices further comprises:
   determining the notification type of the haptic notification message based on the notification identifier; and
   determining whether the notification type is within a pre-defined set of one or more notification types.

7. The non-transitory computer-readable medium of claim 6,
   wherein the haptic effect is based on the notification type.

8. The non-transitory computer-readable medium of claim 7, wherein the haptic effect comprises one of: a vibrotactile haptic effect; a deformation haptic effect; or an electrostatic friction haptic effect.

9. The non-transitory computer-readable medium of claim 1, wherein the determining whether the haptic notification message is to be transmitted to the subset of haptic notification devices further comprises:
   determining whether each haptic notification device of the subset is registered with the network based on respective haptic notification device identifiers.

10. The non-transitory computer-readable medium of claim 1, wherein the tool also generates a haptic notification in response to the tool detecting the event.

11. The non-transitory computer-readable medium of claim 1, wherein the tool comprises one of: an electric drill; an electric saw; an electric nail gun; an electric knife; or an electric hammer.

12. The non-transitory computer-readable medium of claim 1, wherein each haptic notification device comprises at least one of: a mobile device configured to generate haptic effects; a wearable device configured to generate haptic effects; or another tool.

13. The non-transitory computer-readable medium of claim 1, when the event comprises one of: a change in one or more characteristics of the tool or a component of the tool; a movement of the tool to a target distance; an occurrence of an object within a pre-determined distance of the tool; a disparity in size of a component of the tool in relation to an intended action of the tool; or an occurrence of a user within a pre-determined distance of the tool.

14. The non-transitory computer-readable medium of claim 1, further comprising transmitting the haptic notification message to at least one other tool using the network;
   wherein the at least one other tool generates a haptic notification in response to receiving the haptic notification message.

15. A computer-implemented method for facilitating communication of haptic notification messages between a tool and a set of two or more haptic notification devices, the computer-implemented method comprising:
   receiving, at a haptic messaging controller, a haptic notification message from the tool within a network, wherein the haptic notification message indicates that the tool has detected an event identifying one or more operational characteristics of the tool;
   determining, based on a notification type of the haptic notification message, whether the haptic notification message is to be transmitted to a subset of haptic notification devices within the network; and
   transmitting the haptic notification message to the subset of haptic notification devices according to identifiers included in the haptic notification message that identify the subset of haptic notification devices as recipients;

wherein the subset of haptic notification devices generate respective haptic notifications in response to receiving the haptic notification message.

16. The computer-implemented method of claim 15,
wherein the haptic notification comprises a haptic effect;
wherein the haptic notification message comprises a notification identifier; and
wherein the determining whether the haptic notification message is to be transmitted to the subset of haptic notification devices further comprises:
determining the notification type of the haptic notification message based on the notification identifier; and
determining whether the notification type is within a pre-defined set of one or more notification types.

17. The computer-implemented method of claim 16,
wherein the haptic effect is based on the notification type; and
wherein the haptic effect comprises one of: a vibrotactile haptic effect; a deformation haptic effect; or an electrostatic friction haptic effect.

18. The computer-implemented method of claim 15, wherein the haptic notification message comprises a haptic notification device identifier;
wherein the determining whether the haptic notification message is to be transmitted to the subset haptic notification devices further comprises:
determining whether each haptic notification device is registered with the network based on the haptic notification device identifier.

19. The computer-implemented method of claim 15, further comprising transmitting the haptic notification message to at least one other tool using the network;
wherein the at least one other tool generates a haptic notification in response to receiving the haptic notification message.

20. A haptic messaging control system for facilitating communication of haptic notification messages between a tool and a set of two or more haptic notification devices, the system comprising:
a memory configured to store a haptic notification communication module; and
a processor configured to execute the haptic notification communication module stored on the memory;
wherein the processor, when executing the haptic notification communication module, is configured to receive, at the haptic messaging control system, a haptic notification message from the tool within a network, wherein the haptic notification message indicates that the tool has detected an event identifying one or more operational characteristics of the tool;
wherein the processor, when executing the haptic notification communication module, is further configured to determine, based on a notification type of the haptic notification message, whether the haptic notification message is to be transmitted to a subset of haptic notification devices within the network;
wherein the processor, when executing the haptic notification communication module, is further configured to transmit the haptic notification message to the haptic notification devices according to identifiers included in the haptic notification message that identify the subset of haptic notification devices as recipients; and
wherein the subset of haptic notification devices generate respective haptic notifications in response to receiving the haptic notification message.

21. The system of claim 20,
wherein the haptic notification comprises a haptic effect;
wherein the haptic notification message comprises a notification identifier; and
wherein the processor, when executing the haptic notification communication module, is further configured to determine the notification type of the haptic notification message based on the notification identifier; and
wherein the processor, when executing the haptic notification communication module, is further configured to determine whether the notification type is within a pre-defined set of one or more notification types.

22. The system of claim 21,
wherein the haptic effect is based on the notification type; and
wherein the haptic effect comprises one of: a vibrotactile haptic effect; a deformation haptic effect; or an electrostatic friction haptic effect.

23. The system of claim 20, wherein the haptic notification message comprises a haptic notification device identifier;
wherein the processor, when executing the haptic notification communication module, is further configured to determine whether each haptic notification device of the subset is registered with the network based on the haptic notification device identifier.

24. The system of claim 20,
wherein the processor, when executing the haptic notification communication module, is further configured to transmit the haptic notification message to at least one other tool using the network;
wherein the at least one other tool generates a haptic notification in response to receiving the haptic notification message.

25. The computer-readable medium of claim 1, further comprising determining, based on the notification type of the haptic notification message, whether the haptic notification message is to be transmitted to another tool within the network.

26. The computer-readable medium of claim 1, further comprising determining notification types of haptic notification messages that are to be transmitted to the subset of haptic notification devices.

* * * * *